Figure 1:
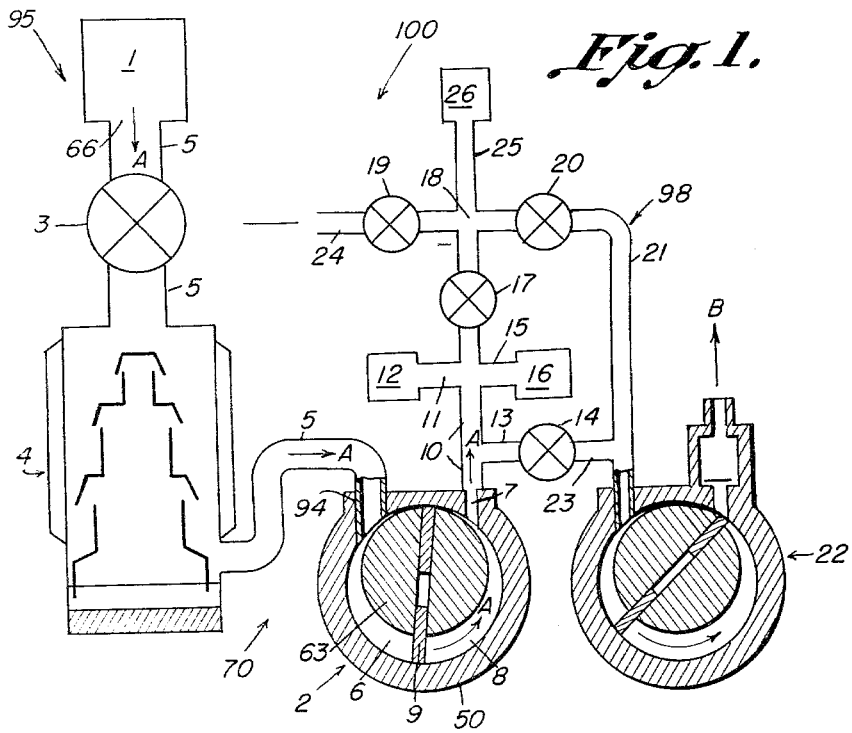

Jan. 18, 1966     T. KRAUS     3,229,500

GAS METERING AND ANALYZING APPARATUS

Filed Aug. 9, 1962

INVENTOR

THADDÄUS KRAUS

BY

ATTORNEYS

United States Patent Office 3,229,500
Patented Jan. 18, 1966

3,229,500
GAS METERING AND ANALYZING APPARATUS
Thaddäus Kraus, Vaduz, Liechtenstein, assignor, by mesne assignments, to Bendix-Balzers Vacuum, Inc., Rochester, N.Y., a corporation of Delaware
Filed Aug. 9, 1962, Ser. No. 215,975
Claims priority, application Austria, Aug. 12, 1961, 6,265/61
3 Claims. (Cl. 73—19)

This invention generally relates to gas metering and analysis and is particularly directed to an arrangement for conveying relatively small gas volumes from a gas source to a gas metering and/or analyzing location.

Gas analysis and gas metering (hereinafter collectively referred to as "gas metering") have recently gained increased importance in different fields of technology as the metering of gases is frequently resorted to for the purpose of determining the qualitative and/or quantitative composition of materials. It is, for example, common practice to gain knowledge of the nature and characteristics of various test materials by analyzing and measuring the gases which are evolved from the respective material at varying temperatures, as the information thus obtained is a measure for certain properties of the material. In metallurgy, the so-called "hot extraction" process is commonly used for liberating gases from test materials, which gases are then subjected to various analytical and metering procedures. In the hot extraction process, the test material, accommodated in a graphite or the like crucible, is melted in a small vacuum furnace. The liberated gases are then withdrawn from the vacuum furnace by a pump and conveyed through a conduit to the respective metering devices. The metering devices may be of physical and/or chemical nature to examine and determine various properties and characteristics of the respective gas or gas mixture.

It is thus known in the art to determine the quantity of a gas by measuring the pressure in a metering chamber or space of defined volume. This determination is effected pursuant to the law $$pV = \frac{m}{M} RT = nRT$$

wherein $p$ is the pressure, $V$ the volume, $m$ the amount of the gas in grams, $M$ the mean molecular weight of the gas, $n$ the number of moles, $R$ the general gas constant, and $T$ the absolute temperature.

The heat conducting moiety, for example hydrogen, of a gas mitxrue, can also be calculated by ascertaining the heat conductivity of the mixture.

According to another known method, the infrared absorption of a gas mixture is measured for the purpose of determining the content of infrared absorbing components as, for example, carobn monoxide.

Further, the presence of halogen-containing compounds can be readily and sensitively demonstrated in gas mixtures with alkali activated platinum diodes. The above indicated procedures serve as examples for the many analytical and metering procedures which are available for determining the characteristics of various gas mixtures.

In some instances, the qualitative composition of the gas mixture to be tested is known from the outset and the purpose of the gas metering is then, of course, quantitatively to determine the amount of percentages of the various components.

Thus, for example, if it is known that the hot extraction of a predetermined steel stample will yield substantially hydrogen, oxygen (or carbon monoxide) and nitrogen only, a determination of the total gas quantity and the quantities of hydrogen and carbon monoxide make it possible to deduce and calculate the nitrogen content in the gas.

While prior art processes for metering and analyzing gas mixtures are generally reliable inasmuch as the metering or analyzing procedure proper is concerned, it is well known that considerable and uncontrollable losses are oftentimes incurred in conveying the gas from the gas evolving source to the respective metering equipment. Such losses, of course, seriously affect the final result, so that in many instances unreliable test results are obtained.

It should also be considered that not only losses of gas during its travel from the source to the measuring location should be prevented, but that the gas should be conveyed to the measuring equipment as rapidly as possible.

Accordingly, it is a primary object of this invention to provide an arrangement for conveying relatively small volumes of gas from a gas source to a measuring station in a rapid manner without appreciable losses.

Another object of this invention is generally to improve on the art of conveying, metering and analyzing gases.

The present invention therefore provides for a novel arrangement for the reliable quantitative and qualitative analysis of gases conveyed by a pump from the source to a metering station having a defined metering space where various physical characteristics of the gases are to be determined.

While the invention is applicable to the conveying of gases to a metering space in general, the invention will be explained with reference to the hot extraction process previously referred to.

In the usual arrangements for conveying the gas to be analyzed, from the gas source to the metering space or station, the source is connected with the metering space through a pipe line. The pump is connected in the pipe line and the pumping action of the pump exhausts the gases from the source into the inlet side of the pump. The gases then pass through the pump passage or duct and exit from the pump through its discharge end into the metering space. In all the prior art constructions, a valve or blocking means is provided at the discharge end of the pump for the purpose of closing the discharge end after a predetermined amount of gas has been delivered into the metering space. The pump is thus closed off from the metering space during the measuring procedure proper so that the metering space, during metering, defines a predetermined volume.

In accordance with an essential feature of this invention, it has been ascertained that improved results are obtained by directly connecting the metering space to the discharge end or line of the pump without interposition of a valve, the latter instead being arranged at the far side of the metering space. The pressure and the volume of the gases exiting through the discharge end of the pump and entering the measuring space have thus pulsating characteristics in accordance with the pumping action. Extensive experiments have conclusively established that pulsating pressure and volume favorably influence the accuracy of the measurements, particularly of relatively small gas volumes and that, in fact, significantly improved measuring results are obtained in this manner.

In the prior art constructions, mercury pumps, that is, pumps using mercury as sealing medium, for example, Hg-membrane pumps, are employed as conveying means. In some instances, so-called Töpler pumps have been suggested. More recently, it has been proposed to use oil sealed pumps including the very robust rotary oil pumps which have been favored because of their high output capacity. In the manner in which these rotary oil pumps have hitherto been used, they exhibit, however, a most undesirable effect. Most lubricating and sealing oils used in rotary oil pumps dissolve a considerable amount of many gases and owing to the dissolving capacity of the oils, relatively large quantities of gas are absorbed by the oil so that considerable losses are incurred. If small gas volumes are concerned, these losses, in most instances, will be so high that oil pumps cannot be used for the intended purpose. On the other hand, if larger volumes of gases are to be conveyed, then the pump will have to be operated for a relatively long period prior to the metering proper in order to saturate the oil with gases so that after the saturation point has been reached, the pumped gases will pass through the pump duct or passage without dissolving in the oil. This, of course, means considerable delay and owing to absorption and desorption phenomena which are dependent on many factors, such as temperature, accurate measurements are usually not feasible. Generally, it is evident that accurate measurement could possibly only be obtained after a very long running-in period and after equilibrium conditions have been established within the pump. It will be realized by those skilled in the art that a single oil drop laden with gas may give off measurable quantities of the gas for long periods after the introduction of the gas into the pump has been terminated, particularly in a vacuum plant and this phenomenon may thus delay or completely falsify the subsequent measurements. As in customary oil sealed rotary pumps the clearances or dead spaces are generally filled with oil and the valves provided in the discharge end are also oil covered, the use of such prior art oil operated pumps results in faulty measurements.

According to a further feature of the invention, a rotary oil pump is employed in an arrangement for conveying gas from a source to a metering space wherein but minute quantities of oil are used in the pump so that no oil accumulation occurs in the pump passage through which the gases travel and wherein the only oil present in this passage is an oil film adhering to the walls defining the passage.

It has surprisingly been found that by this simple measure, sufficient oil sealing in the pump is maintained while, on the other hand, all the disadvantages of the presence of large oil amounts are overcome. It has been found that the very thin film of lubricating oil remaining in the pump passage and adhering to the walls thereof is no longer capable of retaining or absorbing gases passing through the pump in appreciable amounts, so that gas losses or delays are reduced to a minimum, if not eliminated. By excluding any accumulation of oil in the conveying passage or duct of the pump, the quantity of oil required for properly sealing the pump may be kept at an order of magnitude which is several powers of ten smaller than the quantity hitherto considered necessary, for the proper functioning of the pump.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

Figure 2:
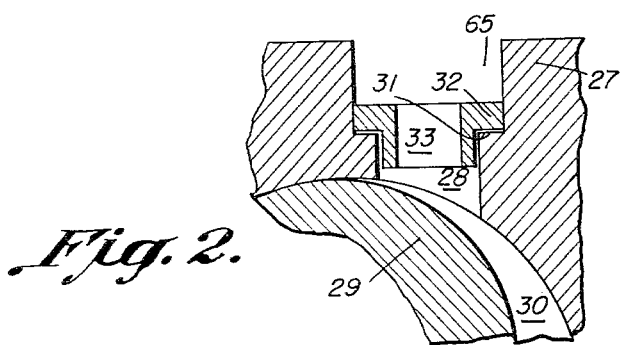

In the drawings:

FIG. 1 is a diagrammatic representation of a vacuum hot extraction gas analysis apparatus embodying the inventive conveying arrangement; and FIG. 2 is a detailed view of a different embodiment of the inventive conveying arrangement.

Referring to the drawings, and in particular to FIG. 1, reference numeral 100 generally indicates a vacuum hot extraction gas analysis apparatus. The apparatus comprises a gas source, generally indicated by reference numeral 95, a gas metering and analyzing apparatus generally indicated by reference numeral 98, and conveying means generally indicated 70 for conveying gases from the source 95 to the gas metering apparatus 98.

The gas source in the present embodiment is a high vacuum hot extraction furnace 1 in which test materials such as, for example, a metal sample, are smelted to evolve gases. The purpose of the apparatus is to convey the gases evolved in the furnace 1 to the gas metering apparatus 98 where the gases are metered and analyzed for the purpose of determining their characteristics and composition.

For this purpose, the furnace 1 communicates with the line 5. The outlet 66 from the furnace 1 may be closed by means of a valve 3 situated in the line 5. The arrangement also includes a high vacuum diffusion pump 4 connected in the line 5. Between the furnace 1 and the measuring apparatus 98, a rotary oil pump 2 is provided in line 5 which conveys the gases from the furnace 1 to the measuring apparatus 98 as indicated by the arrow A. The general construction of the rotary oil pump 2 does not form part of this invention and a description thereof is therefore not called for. Generally, the pump 2 has a casing 50 defining an inlet or suction side or line 94 communicating with line 5, a suction chamber 6, a discharge chamber 8 and an exit or discharge line 7 communicating with the discharge chamber 8. The rotor is indicated at 63. The suction chamber 6 and the discharge chamber 8 are separated by partition member 9. The pump 2 draws in the gases from the pipe line 5 through the inlet 94, whereafter the gases pass through chambers 6 and 8 and are discharged through discharge line 7. Inlet 94, chambers 6 and 8 and discharge line 7 therefore form a flow passage through the pump. In accordance with one feature of the invention, no oil accumulations are present in the passage for the gas through the pump, that is, the passage defined by elements 94, 6, 8 and 7, but merely a thin oil film adheres to the walls defining these elements.

In accordance with another feature of the invention, a conduit 10 of the measuring apparatus 98 directly communicates with the discharge line 7 of the pump 2 without the interposition of any valve or blocking member. Conduit 10 communicates through branch lines 11 and 15 with pressure measuring device 12 for measuring the pressure of the gas delivered by the pump and with heat conductivity measuring device 16. Branch line 13 with valve 14 also communicates with line 10 for a purpose to be explained below. Discharge chamber 8, discharge line 7, conduit 10, lines 11, 13 and 15 and devices 12 and 16 thus define a first metering chamber in which suitable measurements can be performed. The volume of this metering chamber during operation of the pump 2 varies, the variation being the greater the smaller the volume of the connected devices. As previously mentioned, conduit 10 of the measuring apparatus 98 directly communicates with the discharge line 7 of the pump 2. Instead of providing valve means in the discharge line 7, valves 17 and 14 are provided, valve 17 being arranged in line 10 above the branch lines 11 and 15, while valve 14 is arranged in the branch line 13. By providing the valves 14 and 17 behind the first metering chamber, a more compact, space-saving arrangement is arrived at. In order to obtain a better overall representation of the arrangement, a relatively long connecting line 10 has been indicated in FIG. 1, and branch line 13 has been shown for the provision of the valve 14 referred to. It should be understood, however, that considered from a constructional point of view, conduit 10 could be much shorter and the branch line 13 with the valve 14 could be eliminated altogether. In the alternative, branch line 13 could be provided at the same level as the other two branch lines 11 and 15.

The device generally indicated by reference numeral 16 is a compartment or space for measuring the heat conducting properties of the gas. As previously mentioned, the measurement of the heat conductivity is particularly suitable for determining the hydrogen content of gases evolved by hot extraction.

Valve 17 closes conduit 10 and thus contributes to define the first metering chamber constituted by members 8, 7, 10, 11, 12, 13, 15 and 16. A second metering chamber is defined by the gas collecting chamber 18 which, in the embodiment here shown, is indicated as a branched conduit system terminated by valves 17, 19 and 20 and the infrared absorption measuring device 26. Valve 19 opens into an additional line 24 through which a neutral rinsing gas, for example, dry air, may be injected into the apparatus. Valve 20 previously referred to connects the gas collecting chamber 18 through the line 21 with an auxiliary vacuum pump 22. Valve 14 and line 23 connect the first measuring chamber with the auxiliary vacuum pump 22.

The gas measuring apparatus of FIG. 1 moreover includes the infrared absorption measuring device 26 which is connected with the gas collecting chamber via the line 25. The infrared absorption measuring device 26 is suitable for determining the amount of carbon monoxide in the gas in known manner.

The apparatus here described and illustrated substantially operates as follows: The purpose is to meter and analyze gases evolved at the source 95 and conveyed to the gas measuring apparatus 98. Before the vacuum hot extraction furnace 1 is heated to cause the smelting of the sample and thus the liberation of gases, the furnace 1 and the entire system including at least the first metering chamber are evacuated. This is accomplished by operating the diffusion pump 4, the rotary pump 2 and the auxiliary pump 22 while properly positioning the various valves so that any gas in the system exits through the discharge of the auxiliary pump 22 as indicated by the arrow B. After the system has been completely evacuated, the first metering chamber and the gas collecting chamber are closed toward the outside and toward each other by correspondingly positioning the valves 14, 17, 19 and 20. The diffusion pump 4 and the rotary pump 2 continue to operate. The test sample is now heated in the vacuum furnace 1, whereby gases are liberated. These gases, by the action of the pumps 4 and 2, thus travel through the line 5, the pump 4, the inlet line 94, chambers 6 and 8, through the discharge line 7 of the pump 2 into the first metering chamber of the apparatus 98. The provision of the diffusion pump 4 with the valve 3 satisfies the required high vacuum conditions. The pressure in the first metering chamber thus constantly pulsates and gradually increases. The pressure measuring device 12 may be constituted, for example, by a mercury U-pipe manometer or by an electrical pressure gauge forming a mean value. The continuously increasing mean pressure value in the first metering chamber is constantly indicated by the pressure measuring device 12 and, at a defined volume of the metering chamber and at defined temperature, a value is arrived at in accordance with the formula previously referred to. This value is proportional to the total amount of gas which has been conveyed up to the instant of measurement. The temperature can be measured in any manner known, per se, for example, at the pump casing by means of temperature sensing means. The pressure indication can be calibrated directly in units of gas quantity, for example, in millimeter HgX liter, normal mm.$^3$, according to the number of moles or, if the type of gas is known, in grams. For this purpose, it is not necessary to ascertain the volume of the first metering chamber since the calibration can be effected with known gas quantities. Since the actual volume fluctuates constantly, only an effective value could be indicated for this purpose.

In the event that the temperature of the conveyed gas is to be measured very accurately, it is advantageous to construct the conduit system 10, 11, 13 and 15 of the first metering chamber in the form of bores of a solid metal block which is in good heat-conducting communication with the pump, so that a uniform temperature within the conduits and the connected measuring devices prevails.

The conveyed gas volume, calculated on normal pressure and temperature, can be readily ascertained in cubic millimeters. A relative measuring accuracy of some pro mille can be obtained which, for practical purposes, and considering the small total gas volume, constitutes a very good result, particularly if compared with the results hitherto obtained in hot extraction analysis.

The apparatus described in FIG. 1 may be used for the following further measurements: The heat conductivity measuring device 16 indicates directly the heat conductivity of the gas. The heat conductivity, provided that only hydrogen, oxygen and/or nitrogen gases are evolved by the sample, is a measure for the hydrogen content of the gas. From the calibrating graph to be described for the apparatus, the hydrogen content can be deduced in normal cubic millimeters in dependence on the value obtained in the heat conductivity measuring compartment and on the pressure.

After having determined the pressure and the heat conductivity, valve 17 can be opened and the gas thus enters the gas collecting chamber 18 and in turn the infrared absorption measuring device 26. The infrared absorption measurement can now be effected and, considering the expansion of the gas which takes place when the gas enters the chamber 18 and further considering the calibration graph, the carbon monoxide content of the gas mixture can thereby be determined in known manner. However, it is preferred to proceed as follows: Valve 17 is closed again and neutral gas injected through the valve 19 until atmospheric pressure prevails in the chamber 18. Due to the entering neutral gas, the larger portion of the gas to be analyzed is urged into the infrared absorption measuring device 26 where this gas is thus collected under atmospheric pressure. This causes a greater infrared absorption and thus greater measuring accuracy. Further, the last-mentioned procedure has the advantage that upon reevacuation through the pump 22, the required low residual partial pressure of the measuring gases will be obtained more rapidly in the chamber 18 and device 26 which, in turn, results in saving of pumping time.

In some instances, it is advantageous to limit the pulsation of the pressure in the conduit 10 and the measuring devices connected thereto. For this purpose, the discharge line 7 of the pump 2 should be adjustable by the provision of suitable gas throttling means. Such an embodiment is shown in FIG. 2. Reference numeral 27 indicates the pump body in the vicinity of the discharge channel 28. Reference numeral 29 indicates the rotor of the pump, while reference numeral 30 is the discharge chamber of the pump. Channel 28 has an enlarged upper end portion 65 and is provided with a shoulder 31 on which rests an insert piece 32 having a constricted bore 33. Insert pieces 32 with bores 33 of varying diameter can be used, dependent on different metering tasks, so that the gas throttling action can be adapted to the respective circumstances.

It will be realized that the inventive device is not limited for use with a hot extraction analysis apparatus. It will be evident to those skilled in the art that many suitable metering devices can be directly connected to the conduit 10 for the qualitative and/or quantitative determination of gases which are conveyed by a rotary pump like pump 2 of the drawings.

While specific embodiments of the invention have been shown and described in detail to illustrate the application of the inventive principles, it will be understood that this invention may be embodied otherwise without departing from such principles.

What is claimed is:

1. A gas metering and anlyzing apparatus comprising in combination: a gas source, a gas metering and analyzing device defining at least one metering chamber having an inlet and an outlet, positive displacement pump means having an inlet side and a discharge side, passage means directly connecting the discharge side of said pump means to the inlet of the said chamber whereby said pump means forms part of said chamber and causes the volume of said chamber to vary during operation of said pump means, conduit means connecting said source with the inlet side of said pump means, and a valve means for closing the outlet of said chamber during a gas metering and analyzing operation whereby the pressure in said chamber pulsates as a function of the pumping action of said pump means.

2. The gas metering and analyzing apparatus of claim 1 wherein said gas source is at sub-atmospheric pressure.

3. A gas metering and analyzing apparatus having a neutral gas source comprising in combination: a gas source chamber, positive displacement pump means having an inlet and an outlet, conduit means connecting said inlet to said source chamber, a gas metering and analyzing device defining first and second metering chambers, conduit means connecting said outlet to said first metering chamber whereby said pump means when operating discharges directly and continuously into said first metering chamber, connecting means for connecting said first metering chamber to said second metering chamber, a valve in said connecting means for controlling the communication between said metering chambers, and means adapted to selectively connect said neutral gas source to said second metering chamber.

References Cited by the Examiner
UNITED STATES PATENTS

| | | | |
|---|---|---|---|
| 2,296,030 | 9/1942 | Hall | 73—25 |
| 2,393,650 | 1/1946 | Metcalf | 73—26 X |
| 2,641,922 | 6/1953 | Smith | 73—19 X |
| 2,649,011 | 8/1953 | Black | 73—23 X |
| 2,670,625 | 3/1954 | Snavely | 73—30 |
| 2,795,132 | 6/1957 | Boehme et al. | 73—19 |
| 2,904,076 | 9/1959 | Engel et al. | 73—392 X |
| 2,942,470 | 6/1960 | Von Bogdandy et al. | 73—30 X |
| 2,987,912 | 6/1961 | Jacobson | 73—19 |
| 2,991,684 | 7/1961 | Wever et al. | 73—19 X |
| 3,055,207 | 9/1962 | Engelhardt et al. | 73—27 |

RICHARD C. QUEISSER, *Primary Examiner.*

JOSEPH P. STRIZAK, *Examiner.*